United States Patent [19]

Bullinga

[11] Patent Number: 4,674,877
[45] Date of Patent: Jun. 23, 1987

[54] OPTO-ELECTRONIC COLOR SENSOR

[75] Inventor: Lothar H. Bullinga, Marion, Iowa

[73] Assignee: Rockwell International Corporation, El Segundo, Calif.

[21] Appl. No.: 430,583

[22] Filed: Sep. 30, 1982

[51] Int. Cl.⁴ ............................ G01J 1/00; G01J 3/00
[52] U.S. Cl. ..................................... 356/300; 356/28; 356/121; 356/326
[58] Field of Search ............... 356/28, 300, 306, 326, 356/328, 332, 334, 121; 358/67, 69

[56] References Cited

U.S. PATENT DOCUMENTS 3,171,882 3/1965 Baird .................................. 356/306

FOREIGN PATENT DOCUMENTS 111422 7/1982 Japan .................................. 356/334

Primary Examiner—F. L. Evans
Attorney, Agent, or Firm—Robert C. Mayes; Howard R. Greenberg; H. Fredrick Hamann

[57] ABSTRACT

An automatic digital light source adjustment procedure is disclosed wherein a computer calculates a correction factor for each of a plurality of light sources and adjusts the light sources such that each of the light sources meets an optimum performance criteria. In one embodiment, a multicolor cathode ray tube is converged automatically utilizing the present invention by sensing the profiles of the amplitudes of the individual color light intensities versus the same light source position relative to the sensor mechanism for each of the three primary colors, calculating the correction factor and inputting the correction factor to a digital memory, and then providing for the correction factor to be applied to the analog output of the beam control thereafter. Alternative embodiments enhance focus, purity, light line width, color composition, and other performance factors. The sensor, in one embodiment, senses the speed of the relative motion between the light and the sensor, as well as simultaneously sensing the amplitudes of the individual colors.

2 Claims, 13 Drawing Figures

OPTO-ELECTRONIC COLOR SENSOR

CROSS REFERENCE

Cross-reference is made to related patent applications U.S. patent application Ser. No. 430,560, now abandoned entitled "Automatic Digital Light Source Adjustment Apparatus" and U.S. patent application Ser. No. 430,584, now abandoned entitled "Method and Apparatus for Improving Performance in Lighted Displays", both filed on even date herewith, by Lothar H. Bullinga, assignor to Rockwell International Corporation.

BACKGROUND OF THE INVENTION

This disclosure relates to electronics in general and more particularly to a method and apparatus for improving the performance of lighted display units such as cathode ray tubes.

Development of the cathode ray tube as a means of translating electronic information into a humanly perceivable format has obtained rapid, wide-spread acceptance in a variety of applications, most notably television receivers. Additionally, electronic-to-human interface uses such as oscilloscopes and avionics displays have also utilized the CRT and with the advancement of related technology, the miniaturization of components including the CRTs and the ever-present competitive pressures to increase performance and reduce costs to manufacture, continuing research is being conducted. A problem area noted with lighted display units and particularly with multicolor cathode ray tubes has been the relative subjectivity of the convergence, purity, line width, color composition and focus of the display on the screens with respect to the human limitations of the technician who is utilized to perform the alignment. Another problem observed has been the relative complexity of the circuits required to maintain the correction signals once the technician has determined the amount of correction. An addition problem area noted has been the difficulty in discriminating between the respective colors present in a color cathode ray tube, particularly with respect to convergence requirements.

Accordingly, it is an object of the present invention to provide an automatic apparatus for maximizing objectivity of the correction factor computation by utilizing a digital process.

Another object of the present invention is to provide a sensing apparatus eliminating the human subjectivity in sensing the correction quantities.

A yet further object of the present invention is to provide a high speed apparatus for computing the performance of correction factors in a multicolor cathode ray tube and thereby reduce the amount of time required for alignment of a multicolor display.

SUMMARY AND BRIEF DESCRIPTION OF THE DRAWINGS

Briefly, in accordance with the present invention, a light sensor apparatus comprises: a first and a second light entry aperture having a spaced relationship; means for spectrally separating the light beam entering either of the apertures into a plurality of light beams, each of the plurality of beams having a differential light frequency; said means located posterior to the apertures with respect to the travel path of the light beam; and a plurality of light sensors, each located with respect to the means for spectral separation such that only one of each of said plurality of separated light beams from the same aperture impinges upon each sensor.

A light sensor as above may further comprise at least one light sensor for sensing a first light beam entering the first light entry aperture during a first time period, and at least one sensor additionally for sensing a second light beam entering the second aperture during a second time period.

Furthermore, means for timing the interval occurring between the first time period and the second time period above enables the calculation of the time occurring between the sensing of the first light beam and the sensing of the second light beam and, since the distance from the first to the second aperture is known, the speed or velocity of the relative motion between the sensor and the light source can be calculated.

The invention enables the development of an amplitude profile related to the position where the light source intensity has a specific amplitude and thereafter the center of the light beam is located.

In an alternative embodiment, a light sensor apparatus for sensing relative motion between a plurality of light sources and said sensor along an axis approximately 90° to the direction of light travel from the sources comprises: a single aperture for allowing light entry into the apparatus; means for spectral separation of the entering light into a plurality of light components; at least two photoelectric converters, each for sensing a different one of the light components; and means for determining the time interval between the sensing of a component of a first light source at one of said at least two photoelectric converters, and the sensing of the component of a second light source at the same one of said at least two photoelectric converters.

In either of the two above-mentioned embodiments, the spectral separation is performed by prismatic diffraction, light filtration, or by beam splitters, although various combinations of these spectral separation means are possible.

DETAILED DESCRIPTION OF THE INVENTION

DETAILED DESCRIPTION OF THE INVENTION

Figure 1:
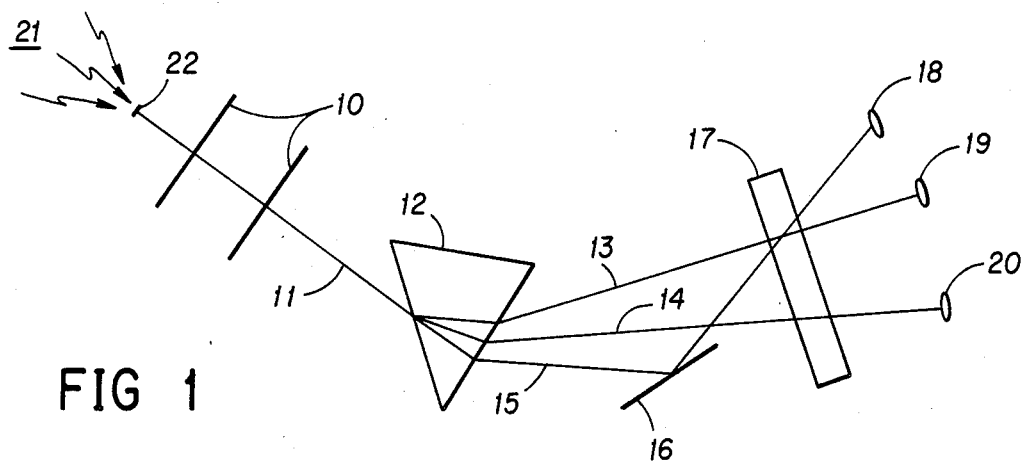
FIG. 1 is a schematic diagram of a sensor in accordance with the present invention.

The use of "profiles" in this application means the amplitude of the respective color (or monochromatic) light source plotted versus its location on the screen of the lighted display. In the case of a shadow masked cathode ray tube, a dot matrix causes a profile to have a shape with peaks across the profile corresponding to the location of rows of dots of that color. Since a beam of electrons in a cathode ray tube is typically 24 mils at normal brightness levels, the slot in the sensor for receiving light, that is the aperture, is also 24 mils. This design approach is reached in the following manner: since the highest resolution corresponds to a single phosphor dot in a dot matrix CRT, the highest resolution amplitude profile would correspond to the width of one dot also, however, if the electron beam width as in the present example, is wider than the typically 2 to 3 mil width of a color phosphor dot, then the amplitude is representative of a portion of the beam and the center of the electron beam cannot be located. Conversely, if a number of colored dots are incorporated in a linear representation typically 200 to 400 mils in length, is observed, and the amplitude profiles are recorded, the center of the beam causing the line to show up on the screen can be obtained by integrating across the width of the lighted surface the light intensity present, relating the integrated light values to specific locations on the screen, and by finding the center of the integrated light. By utilizing 50% of the integral the center of the area under the curve is located with respect to a position on the screen and thus the center of the electron beam is located irrespective of differences in color dot illumination by the beam. The 50% integral method allows the curve to take on an abnormal shape rather than forcing a normal bell distribution and still results in good centering of the location of the beam.

An alternative and more precise method of integrating over the surface useful on a dot matrix CRT is the skewing of the light source while sensing the light amplitude. The light source in one embodiment having its long axis approximately 5°–10° to the left or right of the axis of a repetitive pattern of the color dots on the screen being tested will cause an effective integration over the dots that are swept by the detector, particularly with very fine resolution beams, due to the integration of multiple rows of dots and thus precision location of the center of the electron beam.

Interfacing problems between the sensor and the lighted display are numerous and can be resolved in a number of ways.

First, the curvature of a normal CRT behind its protective glass screen results in a greater distance between the sensor and light source at the periphery of the CRT than at the center of the CRT. This is not a large problem, however, it will limit the degree of resolution obtainable since at the periphery additionally the area requiring the most correction, the sensor will receive light from adjacent dots which is scattered between the dot surface and sensor aperture.

Secondly, the aperture width is narrower than the profile which is to be generated. This is a result of the aforementioned scattering as well as the overlap of the edge of the aperture as it moves across the edge of the beam causing minor light amplitudes at the edges of the profile curve to enter the aperture.

These problems, however, are effectively resolved in the following manner. Since the location of the beam is the desired parameter, the location of the beam relative to the screen and the width of the beam are normally such that utilizing a single dot for maximum resolution determination becomes counterproductive. By utilizing a 3–10 dot width in the scan and developing a profile for that width, and by integrating the information from each of the dots contained within the swept area, these problems become minimal while at the same time the precise location of the center of the beam is obtained. This method has the further advantage of reducing the set-up time and precision required to perform this test since the resolution of 3–10 dots-width is swept by machine or by hand readily and without complex alignment and locating procedures relative to the sensor and the screen.

The center of the light brightness or intensity is defined for the purposes of this application in the following manner: relative motion is obtained between the light sensor and the light source and an amplitude profile is generated either directly or as the integral of the amplitude profile curve. In the directly integrating process the point where the integration reaches one-half its final value is then defined as the center of the amplitude profile and therefore with respect to the relative motion axis, the center of the electron beam. This process may be repeated along a different axis of relative motion, preferably at approximately 90° in an orthogonal relationship to the first direction of relative motion and the approximate center of the beam is located. In a multicolor cathode ray tube this process can occur simultaneously for each of the three colors and the locations of the green, blue and red beams are then clearly known with respect to each other and with respect to the display surface.

One method in accordance with the present invention is practiced to avoid the discreteness of the light by looking at one phosphor light dot and sweeping the electron beam past that dot while monitoring the light intensity. When the dot reaches its maximum light intensity, then the beam is centered on the dot. The cathode ray tube will display all three electron beams, one beam for each primary color, simultaneously. The physical separation of any two adjacent phosphor dots of different colors and the relationship between beam deflection and deflection current are known. Thus, by noting the deflection current required to center the beam of one color on a phosphor dot and then noting the deflection current required to center the beam of another color on an adjacent dot, one can calculate the misconvergence of the two electron beams with respect to each other in the direction of a straight line joining the two dots. This procedure is relatively tedious, however the maximum resolution per dot is obtained in this manner.

An alternative method in accordance with the present invention to avoid the amplitude profile peaking is to measure the light from a larger number of dots simultaneously so that any one dot does not contribute an overly large percentage of the total light sensed. This can be done by drawing a colored line on the cathode ray tube and sensing the light from that line. By using a sensor with a slit aperture and sweeping the sensor past the line in a direction which is perpendicular to the line while holding the aperture roughly parallel to the line, one can integrate the contribution of each dot illuminated so that any one dot does not cause a large jump in sensor output. The usage of a great number of dots provides more light for the sensor, as a second advantage, and thus reduces the sensitivity requirements of the sensor.

The line which is drawn on the screen should not be parallel with a regular dot pattern under normal circumstances because this causes a great number of dots to be illuminated at the same time and still cause the sensor output to change in a regular pattern. Skewing the line with respect to the dot pattern reduces the discrete peaking on the amplitude profile and results in the sensor more closely detecting the amplitude of the electron beam at each position.

Figure 9:
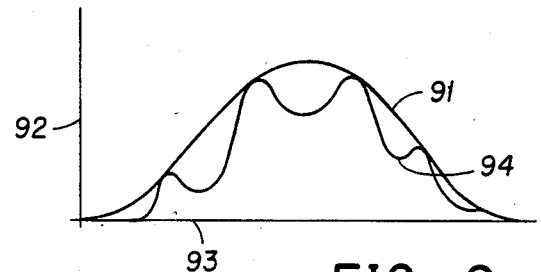
FIG. 9 is an amplitude profile having a normalized bell curve superimposed thereon.

Alternatively, if the irregular pattern is obtained as a result of sensing too few dots, then a full amplitude profile envelope can be generated which encompasses all the peak readings as shown in FIG. 9 and this electronically generated amplitude profile could then be integrated in order to locate the center of the beam.

A third alternative method in accordance with the present invention is to generate a light source centered as a line about the point where the light source characteristics are to be measured and furthermore being short enough so that the average light line exhibits within a predetermined accuracy, the properties of the light at the point where the light source characteristics are to be measured. Alternatively, if the line is longer then the light sensing aperture should be small enough to satisfy the data accuracy requirement.

Another factor determining the desired length of the line is the amount of light gathered should be sufficient to minimize light sensor sensitivity requirements and to minimize the effect of the light source discreteness that is inherent in light sources such as shadow masked cathode ray tube displays where the light source consists of individual color dots. If enough color dots are incorporated in one line, then the effect of the contribution of any one dot to the sensed light characteristic can be held to within predetermined satisfactory limits. The width of the line is normally as narrow as can be obtained, as in for example, the line width caused by one stroke of an electron beam from a cathode ray tube face.

If the light source consists of a dot pattern, then the line axis is skewed with respect to the repetitive dot pattern axis on the order of 5°–10° to minimize the number of dots which emit the same intensity of light at the same position along the width of the line.

For convergence and line width data, the line is oriented so that it is perpendicular to the direction in which convergence or line width data is required.

As previously stated, a relative motion is developed between the sensor and the line. In one embodiment, the line is fixed and the sensor is moved across the face of the screen and passed over the light source. The length of the light detection line, which is a projection of the sensor aperture on the screen, should exceed the light source line length unless the light gathering scheme depends on the sensor for limiting the length of the sensed line light source as discussed above.

The width of the light detector line (sensor projection) is not very critical to obtain the integral of the light intensity. However, for most practical applications, the width of the light detection line is roughly equal to the expected width of the line light source.

After sensing the light, the respective color components, in a color implementation of the invention, are isolated from the detected light and the median point of the integral or one-half of the total integrated value is related to a position on the screen and the center of the electron beam is thus located.

The relative motion between the light source and the light sensor can be obtained in a variety of ways such as, for example, holding the light source fixed on the display surface and moving the sensor across the face to intercept some of the emitted light or to hold the sensor fixed relative to the display surface and sweep the beam across the surface. Either way works in accordance with the present invention; however, for rapid CRT configuration characterization in a production environment, the most reliable method is to hold the beam fixed on the surface and sweep the sensor across the face of the cathode ray tube. This results in a problem encountered with respect to sensing the speed of relative motion such that a constant amplitude profile integral can be maintained and consistent data generated.

The speed sensing is obtained through a variety of methods including dual light source line generation and timing the pulse input time sensed by the sensor, or by providing a dual slit aperture structure for the sensor and a single line generated on the screen and timing the pulse separation from each of the profiles generated from the first slit and from the second slit. Since the distance between the generated lines or the dual apertures is known and the time is observed, the relative motion of the sensor is calculated readily and since the weight of the operator's hand and/or sensor is generally sufficient to maintain inertia wherein the speed will not be changing dramatically over short distance, the assumption is made that the speed is constant over the entire profile generation area and thus the location of the peak of the amplitude profiles generated in this method are centered with respect to the locations sensed by the light sensor.

Referring now to FIG. 1, a light sensor in accordance with the present invention is utilized for separating light 21 entering aperture 22 into beams 13, 14 and 15 and said beams having passed through prism 12, each has a different light frequency and will thus impinge on sensors 18, 19 and 20 respectively. It can be seen in the drawing mirror 16 reflects beam 15 into a position where it will impinge upon sensor 18 after passing through lens 17. The dual aperture configuration 10 provides for conforming entering light 21 into a narrow beam 11 for precise alignment of prism 12 mirror 16, lens 17 and each of the sensors 18, 19 and 20.

Figure 2:
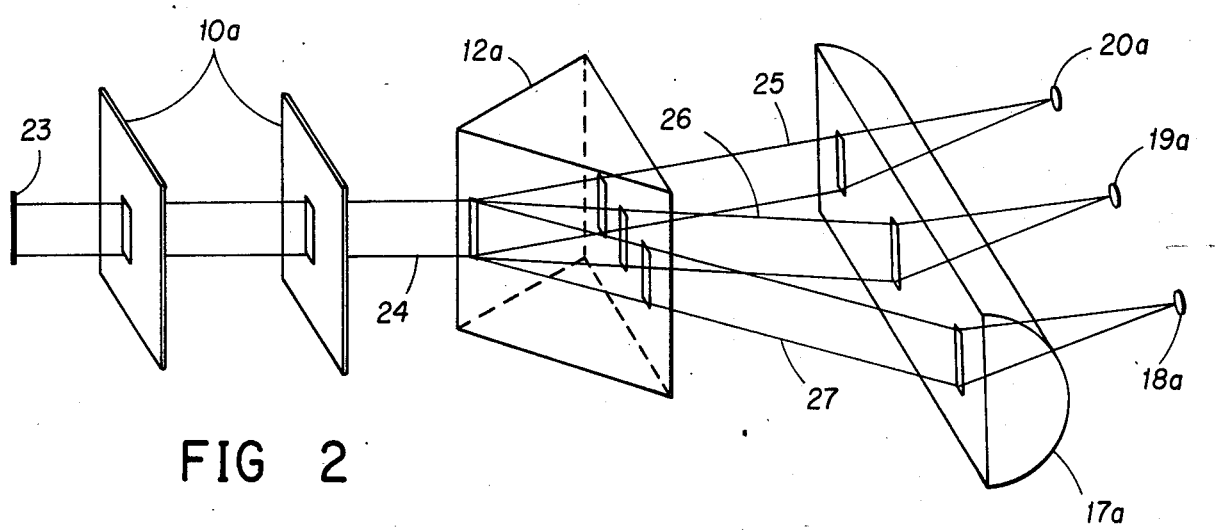
FIG. 2 is a perspective view of a sensor apparatus in accordance with the present invention.

Referring now to FIG. 2, a light sensor in accordance with the present invention is disclosed shown in perspective view for enhanced illustration. Light entering from light source 23 is confined to a narrow travel path, beam 24, by dual slit arrangement 10a. The beam 24 impinges upon prism 12a and is split into its component frequencies and thereby becomes a plurality of light beams, each having different frequencies. Beam 25, for example, is defracted by prism 12a, proceeds to travel through lens 17a and impinges upon sensor 20a. Beam 26 has a different frequency from that of beam 25 and travels through lens 17a to impinge upon sensor 19a. Beam 27 again has a different frequency and travels through lens 17a to impinge on sensor 18a. It can be seen with the white light source present at slit 23 by the appropriate location of sensors 20a, 19a and 18a, the respective frequencies of a white light source may be observed individually.

Figure 3:
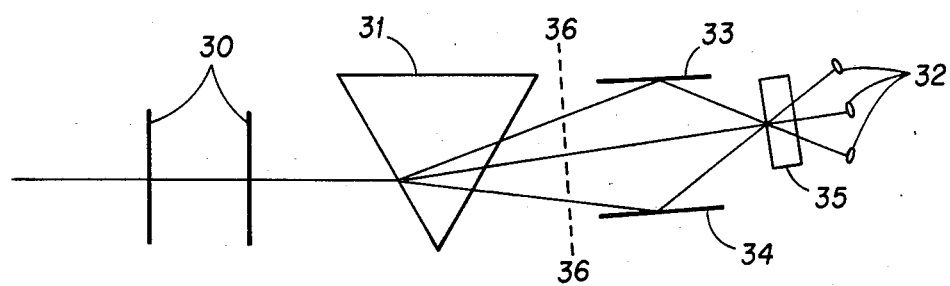
FIG. 3 is a schematic diagram of an alternative embodiment of a sensor in accordance with the present invention.

Referring now to FIG. 3, an alternative embodiment of a light sensor in accordance with the present invention is shown wherein a light beam entering the sensor is defined as a beam by the two-stage slit configuration 30 and thereafter is defracted by prism 31 into component frequencies at section line 36. Two mirrors 33 and 34 enable the designer to adjust the location of sensors 32 relative to prism 31 and lens 35 such that the desired light frequency will impinge upon the appropriate sensor.

Figure 4:
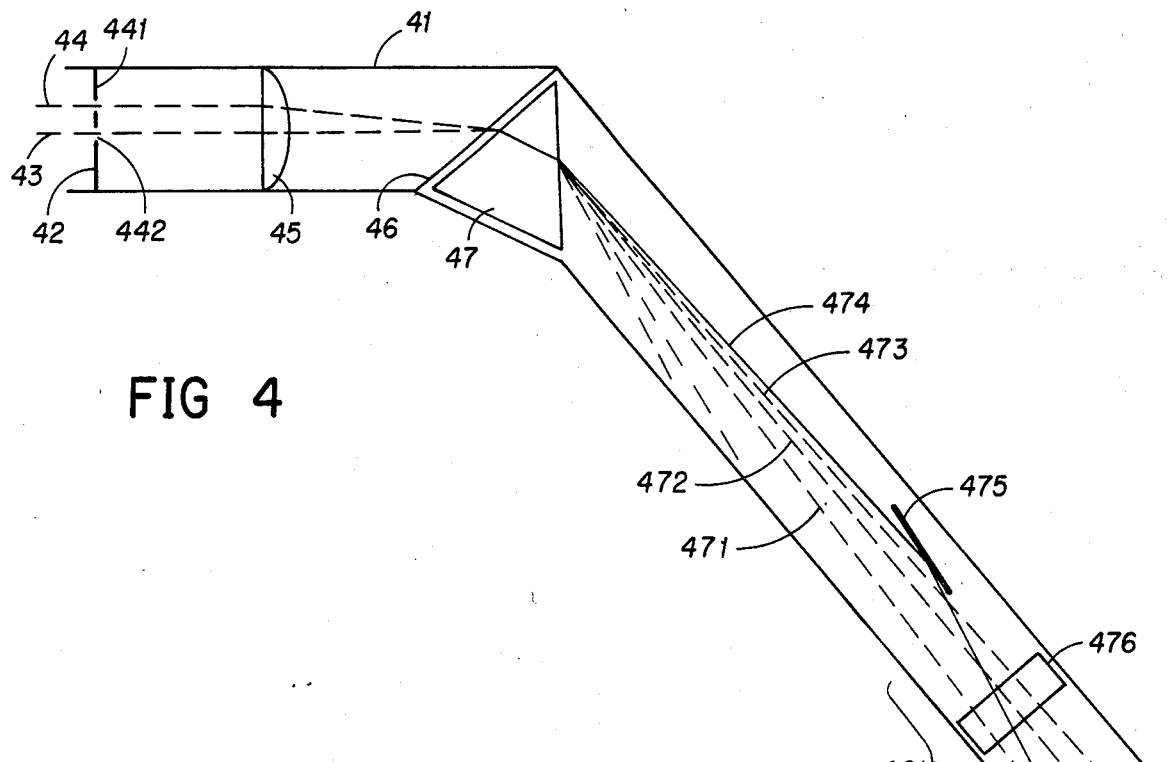
FIG. 4 is a schematic diagram of a dual aperture sensor in accordance with the present invention.

Referring now to FIG. 4, an alternative embodiment of a light sensor in accordance with the present invention is shown wherein two light entry apertures 441 and 442 provide two travel paths for entering light to enter the apparatus 41. Lens 45 is positioned to focus light beam 44 and light beam 43 to the same aperture on shield 46. The light then passing through shield 46 impinges upon prism 47. However, since beam 44 is arriving at an angle different from that of beam 43, the exit angles of the respective component light frequencies are also different. For example, the light beam 474, 473, and 472 are all component light frequencies of beam 43. Component 474 is reflected by mirror 475 through lens 476 to impinge upon sensor 480. In the present example, component 474 is red light and sensor 480 is utilized for detecting red light. Beam 473 is green light and sensor 478 is utilized for detecting green light. Beam 472 is blue light and sensor 479 is utilized for detecting that blue light. The light beam 44 having been defracted at a different angle through prism 47 has its red light component 471 arriving again at sensor 480. The green and blue components of light beam 44 will ordinarily arrive at that portion of the inside of apparatus 41 shown as section 481, and are not sensed by any of the three sensors in the apparatus. In this manner two light beams are defined and are refracted through prism 47. Sensor 480 is positioned to enable it to detect the red light component from light entering either of the apertures and sensors 479 and 478 are positioned to receive different component light frequencies from only one of the apertures.

Figure 5:
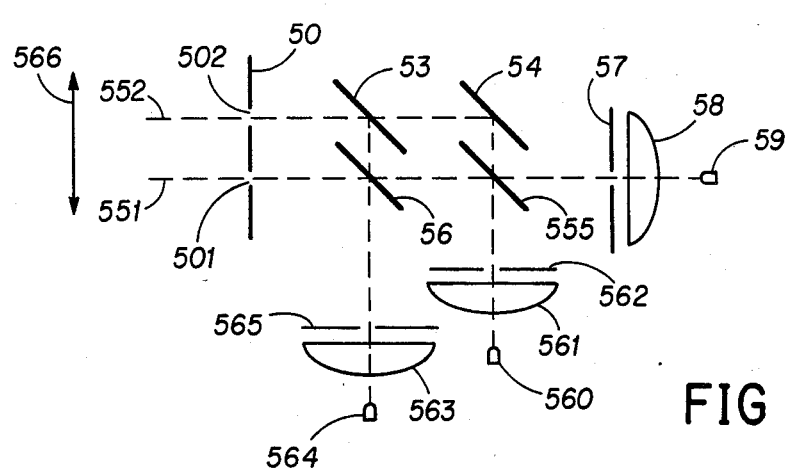
FIG. 5 is an alternative opto-electronic sensor in accordance with the present invention having two apertures and three photoelectronic sensors.

Referring now to FIG. 5, a schematic representation of a dual entry aperture light sensor apparatus in accordance with the present invention is shown utilizing light filters to separate the component light frequencies. Three sensors 564, 560 and 59 are positioned to receive light through their respective lense 563, 561 and 58. The secondary apertures 565, 562 and 57 are utilized to define a light beam similar to the configuration 10a in FIG. 2. Thus, it can be seen that the distances that the light is required to travel from the aperture 502 or 501 to the sensors 564, 560 and 59 is adjusted such that the travel paths are approximately equal. This requires sensor 564 to be at a distance greater from filters 53 and 56 than sensor 560 is from filters 54 and 555 and that sensor 59 is approximately the same distance from filter 555 as is sensor 560.

In one embodiment, the sensor disclosed in FIG. 5 has a green filter 53, a blue filter 56 and a red filter 55 positioned such that the respective color will be reflected and the remaining light frequencies will be transmitted through the filter. In this exemplary embodiment, 54 is a mirror and reflects all impinging light frequencies. Light entering aperture 502 impinges upon green filter 53 and the green component is reflected toward sensor 564. The remaining frequencies are reflected by mirror 54 and impinge upon red filter 555 to provide a red signal into sensor 59. The green component reflected by filter 53 is transmitted through blue filter 56 and impinges upon sensor 564. The light not reflected by green filter 53 and not reflected by red filter 555 will impinge upon sensor 560, and in a multicolor cathode ray tube for example, that color will be blue. Thus, it can be seen that light entering slit 502 provides a green signal at 564, a blue signal at sensor 560 and a red signal at sensor 59. Conversely, light entering aperture 501 as beam 551 is separated into component frequencies in the following manner: the blue filter 56 reflects the blue component to sensor 564. The remaining light impinges upon filter 555 and the red component is reflected to sensor 560. The remaining component, normally green in a multicolor cathode ray tube, impinges upon sensor 59. Thus, it can be seen that by the positioning of the filters as in the present invention the respective apertures will provide for different component frequencies to impinge upon different sensors. It should be noted that the location of the red, green or blue filters is entirely interchangable to obtain a desired sensor location with respect to color frequency. Additionally, the mirror 54 may be replaced with an additional filter as required and each of the filters and mirror are located at an approximate 45° angle to light travel path for maximum reflection and transmittance. Directional arrow 566 represents the relative motion that the sensor would obtain in accordance with the present invention to provide for light from a single source to enter first one of the two apertures 501 or 502 and then the second of the apertures, either aperture first. In this manner, a light source may be characterized with respect to the component frequencies amplitudes and since the distance from aperture 502 to aperture 501 is known it can be seen that as the sensor is moved across a light source, such as a line light source on a CRT, the speed may be calculated by timing the interval from the impinging of red upon the sensor designed to receive red from the first slit and impinging of red upon the second sensor designed to receive red. Additionally, any one of the three sensors may be eliminated and yet all of the required information will still be readily obtainable.

Figure 6:
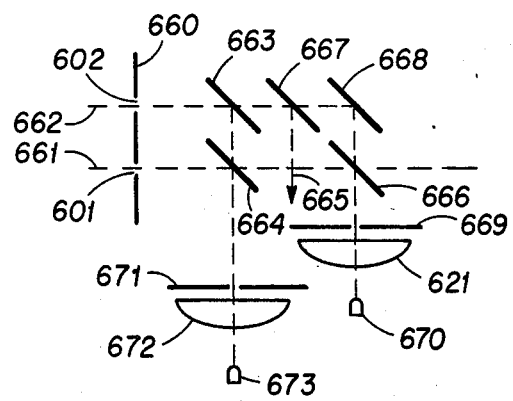
FIG. 6 is an alternative embodiment of a sensor in accordance with the present invention having two apertures and two photoelectronic sensors.

Referring now to FIG. 6, an alternative embodiment of the present invention is shown having dual entry apertures and a plurality of light filters as well as two light sensors positioned to receive light from either of said apertures. Mirror 668 is positioned at an approximately 45° angle to light travel as are filters 663, 667, 666 and 664. In this configuration, the requirement for red, blue and green light filters is obviated by the addition of filter 667 and thus the green filter, normally less responsive than either red or blue, is eliminated. In the present example, a red filter 663 is positioned to receive light from aperture 602 and reflect the red component through blue filter 664 to sensor 673. The remaining light components proceed through filter 663 and are filtered by blue filter 667 such that only green light remains to impinge upon mirror 668 and travel through red filter 666 to impinge upon sensor 670. Thus, red light entering aperture 602 impinges upon sensor 673 and green light entering aperture 602 impinges upon sensor 670. The blue light entering aperture 602 is shown at 665 and is not received by a positioned sensor. The light source 661 entering aperture 601 first impinges upon blue filter 664 and that blue component is received by sensor 673. The remaining light travels through blue filter 664 to impinge upon red filter 666 and is filtered such that the red component impinges upon sensor 670. Thus, it can be seen that for a single light source moving relative to the sensor across apertures 602 and 601 that first the red component of that light source will impinge upon sensor 673 while at the same time the green component impinges upon sensor 670. Subsequently, the source passing over apertures 601 will provide a blue component at sensor 673 and a red component at 670. In this manner, each of the three light components is received and additionally the red component is received twice, enabling the timing of the interval between red entry in the first aperture and red entry in the second aperture and thus calibration of the speed at which the light source is moving relative to the sensor.

Figure 7:
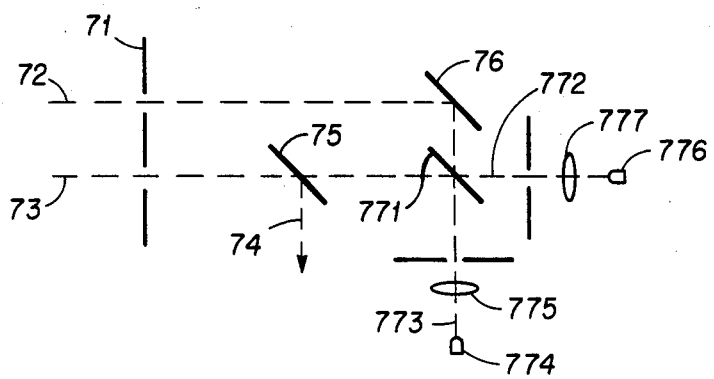
FIG. 7 is an alternative embodiment of an opto-electronic sensor having two apertures and two photoelectronic sensors.
Figure 12:
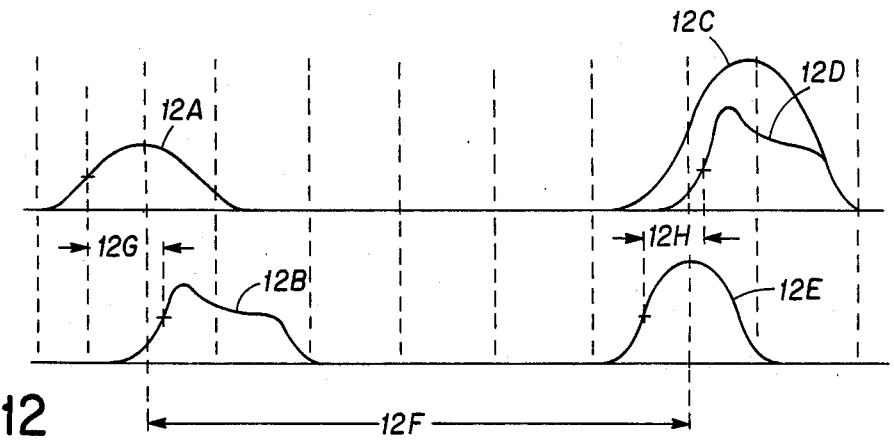
FIG. 12 is an amplitude profile for a cathode ray tube having the amplitudes of various colors plotted in conjunction with the time of sensing.

Referring now to FIG. 7, a preferred embodiment of a sensor in accordance with the present invention is shown having red filter 771 and blue filter 75 positioned to receive light at approximately 45° angle. Light beam 73 impinges upon blue filter 75 and thereafter the blue component 74 is not detected. The remaining red and green components impinge upon filter 771 and the red component is reflected to sensor 774 through lens 775. The green component 772 is received by sensor 776 through lens 776 through lens 777. As the light source 72 enters the sensor mirror 76 reflects the light through red filter 771 and provides the red light reflected into sensor 776 and the blue and green components impinging upon sensor 774. The blue and green components are separated in one embodiment in the following manner: Referring to FIG. 12, a light source is passed in front of the sensor shown in FIG. 7 to generate the amplitude profiles shown in FIG. 12. Curve 12a and curve 12b result from light entering as beam 73 in FIG. 7. Curves 12c and 12e result from the same light source entering as beam 72 into the sensor shown in FIG. 7. The top line in FIG. 12 having curves 12a and 12c represents the amplitude profiles sensed by sensor 774. The bottom line in FIG. 12 having curves 12b and 12e represents the amplitude profiles sensed by sensor 776. In this embodiment, the red light entering sensor 774 is shown as curve 12a. At a somewhat different time, the difference represented by 12g, results in the green amplitude profile shown as 12b being received by sensor 776. As the light source moves from entering aperture 73 to 72, the distance 12f in the amplitude profile is measured by timing the peaks of the red light entering as a component of beam 72 and is transmitted into sensor 776, and that red light entering as beam 73, impinging upon 774 and is represented as curve 12e. The distance from the center of the amplitude of curve 12a to the center of the amplitude of curve 12e represents the time between the red light entering first as beam 73 and secondly as beam 72. Since the distance between the two apertures is known, the speed can then be calculated. Furthermore, since the relative peak amplitudes of curves 12a and 12e may differ as shown in FIG. 12 and since both represent the same source of red light, the difference in sensitivity of the respective sensors can be observed and thereafter compensated. The green light impinging on sensor 776 provides an amplitude profile having a characteristic shape 12b and the cyan color contains both a blue light component and the green light component, the blue component is unknown as previously unsensed since component 74 was reflected in FIG. 7; however, since amplitude profile 12b is known it can be subtracted, again compensating for relative sensor sensitivity, as curve 12d and since the relative positions of the red amplitude in 12a and the green amplitude in 12b are shown by a distance 12g, the subtraction of the green component from curve 12c may occur at the same relative time shown as 12h resulting in the blue light amplitude profile. In this manner, both the values of the amplitude of the blue light as well as its location relative to the sensor is determined, even though not directly observed.

Figure 8:
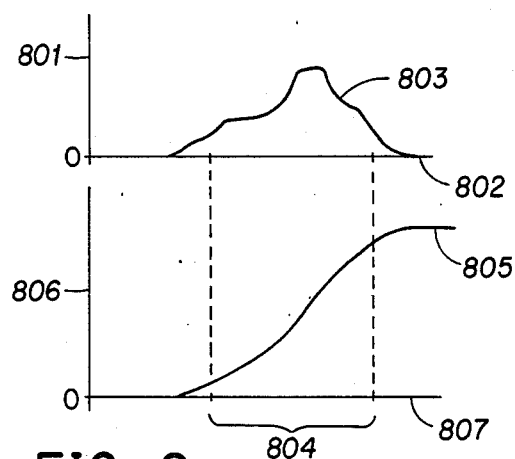
FIG. 8 is an amplitude profile of light intensity versus position plotted in conjunction with the integral of the light intensity plotted versus position.

Referring now to FIG. 8, a graphic representation of an amplitude profile is shown as curve 803 and is related to the integral of that curve 805 wherein the actual electron beam width 804 is represented by the peak amplitude profile shown at 801 and the representation shows that the amplitude profile is somewhat wider at 802 than the actual beam width 804. This is a result of some light scattering at the light entry aperture, and due to finite aperture width.

Either the amplitude profile 803 or its integral 805 may be directly taken from the information sensed by the sensor in accordance invention. The integral is advantageous in providing software benefits since the total value of the sensed light may be divided by 50% to obtain an approximate center of the electron beam for that respective color, or the median intensity point. The amplitude profile may also be used without integration.

Additional methods of determining individual light source position relative to the sensor include controlling the light source guns in a multicolor cathode ray tube such as sensing a white light source or red, green and blue guns on for the first light aperture passage and thereafter immediately turning off one or more of the light source guns such as the green gun such that, in this embodiment, FIG. 12 would represen,t the actual blue color 12c and would preclude the requirement for subtraction of the green profile as was given in the previous example. This color control or the electronic filtering are not essential to the practice of the present invention; however, they may be useful in certain embodiments.

Referring now to FIG. 9, an observed profile 94 is shown as a plot of amplitude 92 versus position 93 and a standardized bell curve 91 is superimposed wherein the irregular peaking of curve 94 is a direct result of the higher intensities present in a dot matrix CRT. By utilizing a skewed light source method or the direct integral method shown in FIG. 8, this irregular amplitude profile configuration is avoided. An alternative method is to utilize a standard curve stored in a memory of a test apparatus in accordance with the present invention for comparing the observed light amplitude and thereafter locating the approximate center of the amplitude profile. This standard curve may be utilized in an iterative process to obtain a relatively close approximation of the actual beam intensity.

Figure 10:
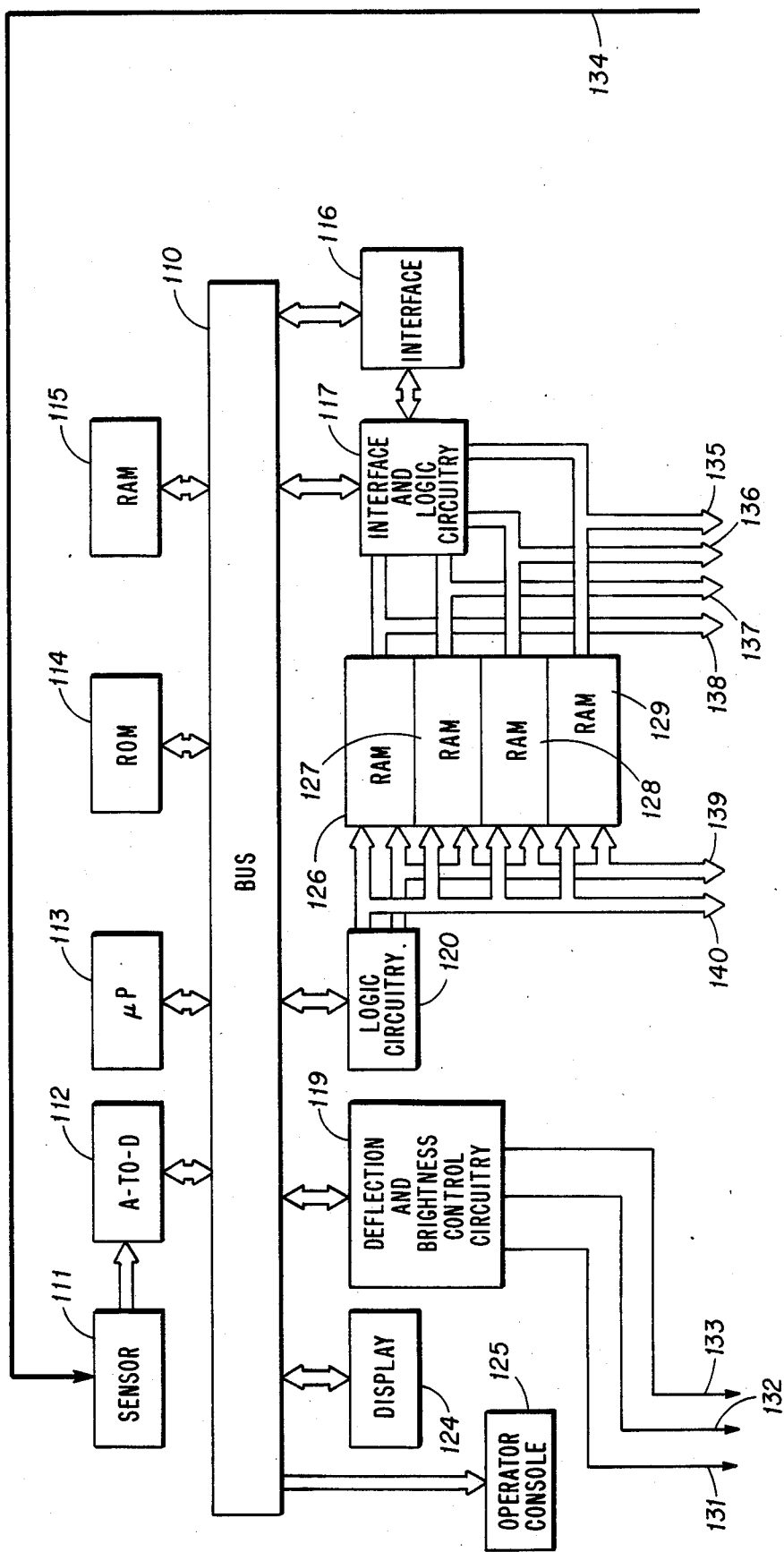
FIG. 10 is a block diagram of an automated digital convergence test unit in accordance with the present invention.

Referring now to FIG. 10, a test and correction factor generation apparatus is shown in block diagram format showing the photoelectronic color sensor 111 receiving the light rays 134 from a CRT or other multicolor display (not shown). The photoelectronic color sensor 111 translates the light rays 134 into analog signals and inputs those signals into the analog-to-digital converter circuitry 112. The analog-to-digital converter circuitry could be implemented by using either an analog signal multiplexer followed by a single analog-to-digital converter or each separate analog signal from the color photo sensor 111 could be processed by its own analog-to-digital converter. The analog-to-digital converter circuitry 112 is connected to the address, data and control busses 110 which is further connected to microprocessor 113 for overall control, programmable-read-only-memory 114 for control of the sensing and correction factor calculation program, and random-access-memory 115 for temporary data storage. Furthermore, operator control input 125 is connected to the address, data and control busses 110 as is the readout 124 and the programmable-read-only memory programmer interface 116. The interface 116 is utilized to program the programmable read-only memory for the specific CRT being tested and thus the interface 116 is only called into operation when the final correction factors have been calculated. U.S. Pat. No. 4,099,092 entitled "Television Display Alignment System and Method" issued to Stephen Bristoe July 4, 1978 provides a basic system for use in aligning a black-and-white television and is useful teaching the underlying and singular channel approach to television display alignment. That patent is incorporated herein by reference.

The present invention, however, additionally utilizes the concurrent sensing of all three colors in a color electron beam display such as a CRT and rather than providing a correction factor to a beam with respect to a specific position, the present invention provides for maximizing each color with respect to the others at all locations over the surface of the display.

Figure 11:
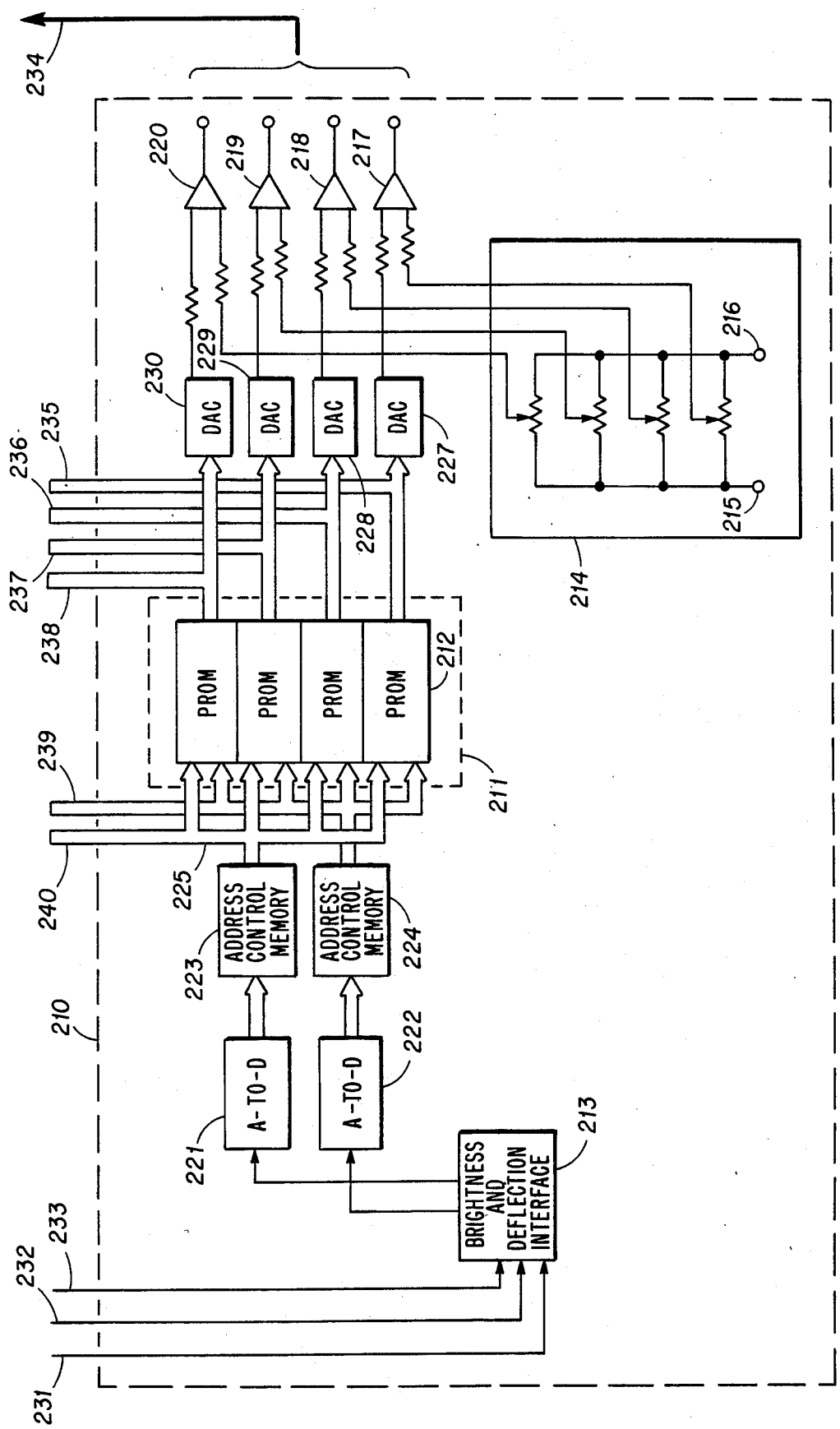
FIG. 11 is a block diagram of a cathode ray tube display unit capable of operation in conjunction with the present invention.

It can further be seen that the test and correction factor generation apparatus shown in FIG. 10 is apart from the CRT, in one embodiment, as shown in FIG. 11. This test apparatus is connected in a laboratory or in a production line area to a series of multicolor displays, in this case cathode ray tubes, one after the other.

In an alternative embodiment, the present invention is utilized to converge a plurality of color electron beams in a multiple image display device utilizing a plurality of individual projectors as shown in U.S. Pat. No. 3,943,279 issued March 9, 1976 to Harald M. Austefjord. That invention utilizes two colors to coincide with a third utilizing a digital convergence procedure and that patent is incorporated herein by reference thereto. That method, however, will not work for a shadow masked cathode ray tube and furthermore requires a operator (human) sensor for measuring misconvergence.

Another U.S. patent to an invention generating correction factor signals for cathode ray tubes incorporated by reference thereto is U.S. Pat. No. 4,203,054 issued May 13, 1980 to Brian R. Sowter. Again, in that patent, the operator must program the "convergence store" by manually inputting the correction factors after observing the convergence on the display. While the operator input in the Sowter invention provides for a lengthy and subjective correction factor, the present invention conversely provides for automatically sensing the relative intensities of each color simultaneously and for calculating the correction factors relative to a given location on the screen for each of the colors, again simultaneously, and those correction factors then are input into the digital memory.

Two other patents, helpful in explaining the background of the invention are U.S. Pat. No. 4,316,211 issued February 16, 1982 to Donald Mackey and Ernest Fox entitled "Color Kinescope Convergence Measuring System" and U.S. Pat. No. 4,203,051 issued May 13, 1980 to Michael H. Hallett et.al. The Mackey et.al. patent describes the then-current state-of-the-art in utilization of a convergence test pattern on a kinescope display screen. The convergence test pattern is a set of alternating color patches and the degree of overlap and gap is indicative of the degree of beam misconvergence in that patent. The present invention, conversely, utilizes a signal detected from a beam without the use of a pattern and compares each color intensity and amplitude to the other colors for a respective location.

The Hallett et.al. patent is particularly useful in describing the operation of a CRT utilizing correction factors to provide convergence and both that patent and the Mackey et.al. patent are hereby incorporated by reference.

The RAM interfacing in logic circuitry 120, also connected to the data, address, and control busses 110, is connected both to the convergence RAMs 126, 127, 128 and 129 and through a plug-in connection to the CRT bus at 140 and 139. When in operation, the test data addresses are transmitted through the bus line connections 140, 139 and connections 138, 137, 136 and 135 to CRT convergence PROM within block 211 and digital-to-analog converters 230, 229, 228 and 227, shown in FIG. 11. While the test unit in FIG. 10 is connected to the CRT shown in FIG. 11 by the dotted line 210, the convergence RAMs 126, 127, 128 and 129 are programmed through an algorithm provided by the microprocessor 113 and PROM 114 of the test unit in FIG. 10. The convergence RAMs then can control the digital-to-analog converters of the CRT as well as the deflection coils and thus the digital correction signal is capable of correcting for any non-linearities in the analog circuitry of the CRT. Data interface and logic circuitry 117 is utilized for programming the convergence RAMs and PROMs for testing the convergence RAM output, testing the convergence PROM output when the CRT PROMs have been programmed, and for disconnecting the convergence PROMs from convergence RAMs while convergence procedure is being conducted and for disconnecting the convergence RAMs when the convergence PROMs are being tested or programmed. Programming the convergence PROMs requires the use of both the data interface 117 and the interface 116.

Referring now to FIG. 11, connections 231, 232, and 233 are made to connections 131, 132 and 133 in FIG. 10 for the deflection and brightness control circuits 119 in the CRT. The CRT is controlled during the test procedure with respect to brightness and deflection by the microprocessor and program in the test unit. The CRT screen (not shown) emits light in a pattern which is modulated by the application of analog deflection signals to the coils which signals are generated by the digital-to-analog converters 230, 229, 228 and 227. The DC offset correction module 214, in the present embodiment, is utilized to adjust for variations in DC offset which may be induced by mechanical disturbance of the coils relative to each other. Maintaining this adjustment factor after digital convergence allows for some mechanical disturbances while the digital convergence still compensates for electrical irregularities in the coils as well as the mechanical differences in the screen coils, mask and other elements.

In the present embodiment, the summing circuitry 220 represents the red radial signal, circuitry 219 represents green radial, the summing circuitry 218 represents the blue radial, and summing circuitry 217 represents the blue lateral direction control for the deflection circuitry. These then are output to the screen which generates a light signal represented by line 234 which is then sensed during convergence by the photoelectronic sensor 111 in FIG. 10. The brightness and deflection control circuit 213 generate an analog signal inputted into X and Y analog-to-digital converters 221 and 222. Then a digital signal is inputted into address control memories 223 and 224 and from there, related into the convergence RAMs in FIG. 10 contained within the test circuitry or after the test circuitry has been disconnected, directly into the convergence PROMs 212.

At this point, the correction factors which have been generated by the convergence RAMs are translated through bus lines 238, 237, 236 and 235 directly into the digital-to-analog converters 230, 229, 228 and 227 or subsequent to the test units disconnection, the convergence PROMs generate the correction factors and input them into the digital-to-analog converters and the CRT has been converged.

It is important to note that the simultaneous sensing of the color amplitudes with respect to one another can result in improved focus by modulating the amplitudes on either side of a predetermined point or the purity of a color by decreasing two colors amplitudes with respect to the third or color composition by adjusting the relative beam strengths of the primary colors or line width by adjusting beam strength and focus. A series of test sequences controlled by the microprocessor unit allow convergence, line width, color composition, purity and focus correction all to be corrected during the automatic digital alignment process, although a variety of circuits are utilized to obtain these objectives. Another factor important to note is that operator interface is limited to placing a photoelectronic sensor where it may receive light from the screen. Another important factor is the element of relative motion between the sensor and the beam generated in the CRT as a result of either moving the sensor while maintaining a fixed beam position or by maintaining the sensor in a fixed location and sweeping the beam is necessary to obtain valid correction data from which the correct convergence, focus line width, color composition, and purity data may be obtained. A system as described above will provide maximum color convergence, purity and focus obtainable since the elimination of human error and the factoring of all component irregularities is obtained.

Figure 13:
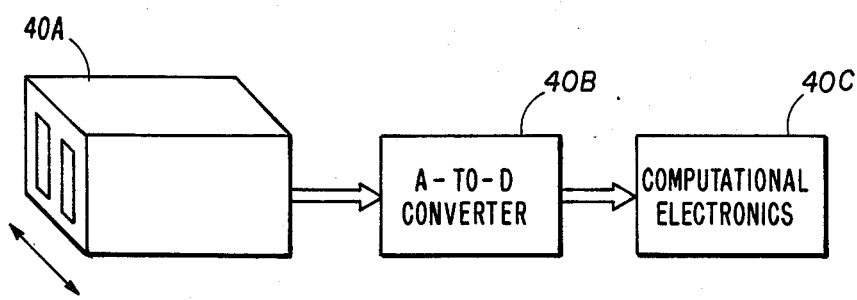
FIG. 13 is a block diagram of a sensor apparatus and amplitude profile detecting unit in close cooperation.

Referring now to FIG. 13, the present invention is shown as a block diagram having opto-electronic sensor 40a connected through a block 40b representing the computational electronics such as previously stated either a multiplexer and analog-to-digital encoder or a parallel configuration of three analog-to-digital converters providing the light source characteristic output at block 40c. The relative motion of the sensor is shown and with a single light source the charateristics of that light source with respect to the various color components can be readily characterized and thereafter converged in accordance with the present invention.

While this invention has been described with reference to an illustrative embodiment, it is not intended that this description be construed in a limiting sense. Various modifications of the illustrative embodiment, as well as other embodiments of the invention, will be apparent to persons skilled in the art upon reference to this description. It is therefore contemplated that the appended claims will cover any such modifications of embodiments as fall within the true scope of the invention.

What is claimed is:

1. A light sensor apparatus for a cathode ray tube convergence system comprising:
   a. a first and a second light entry aperture having a spaced relationship;
   b. means for spectrally separating a light beam from a defined light source on said cathode ray tube having an unknown position relative to said apparatus and entering either of said apertures, into a plurality of light beams, each of said plurality of beams having a differential light frequency; said means located posterior to said aperatures with respect to the travel path of said light beam; and 2. A light sensor apparatus for sensing relative motion between a plurality of light sources emitted from a cathode ray tube and said sensor along an axis approximately 90° to the direction of light travel from said sources comprising:
   a. a single aperture for allowing light entry into said apparatus;
   b. means for spectral separation of said entering light into a plurality of light components;
   c. at least two photoelectric converters, each for sensing a different one of said light components; and
   d. means for determinig the time interval between the sensing of a component of a first light source at one of said at least two photoelectric converters, and the sensig of a componetn of a second light source at the same one of said at least two photoelectric converters.

* * * * *